Figure 1:
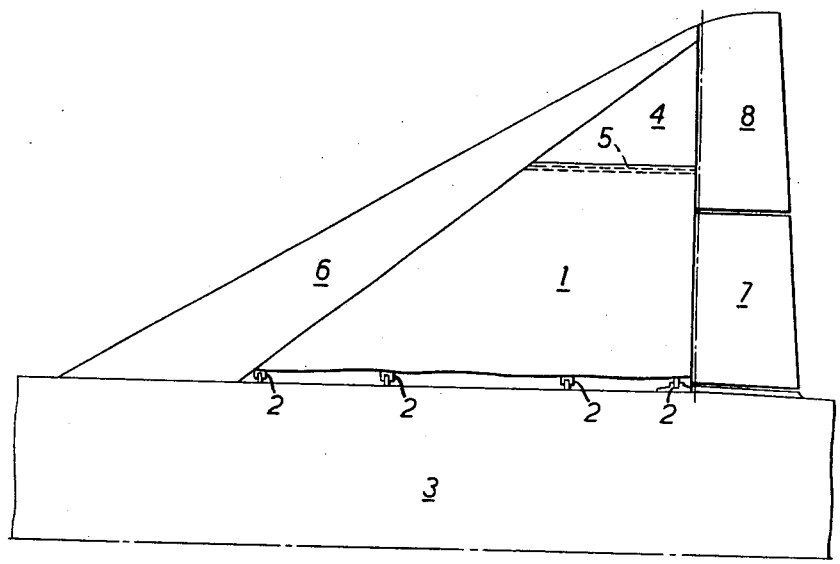

April 28, 1964 R. F. CREASEY ETAL 3,130,944
VARIABLE AREA AIRCRAFT WING
Filed July 26, 1963 3 Sheets-Sheet 1

April 28, 1964

R. F. CREASEY ETAL 3,130,944

VARIABLE AREA AIRCRAFT WING

Filed July 26, 1963

3 Sheets-Sheet 2

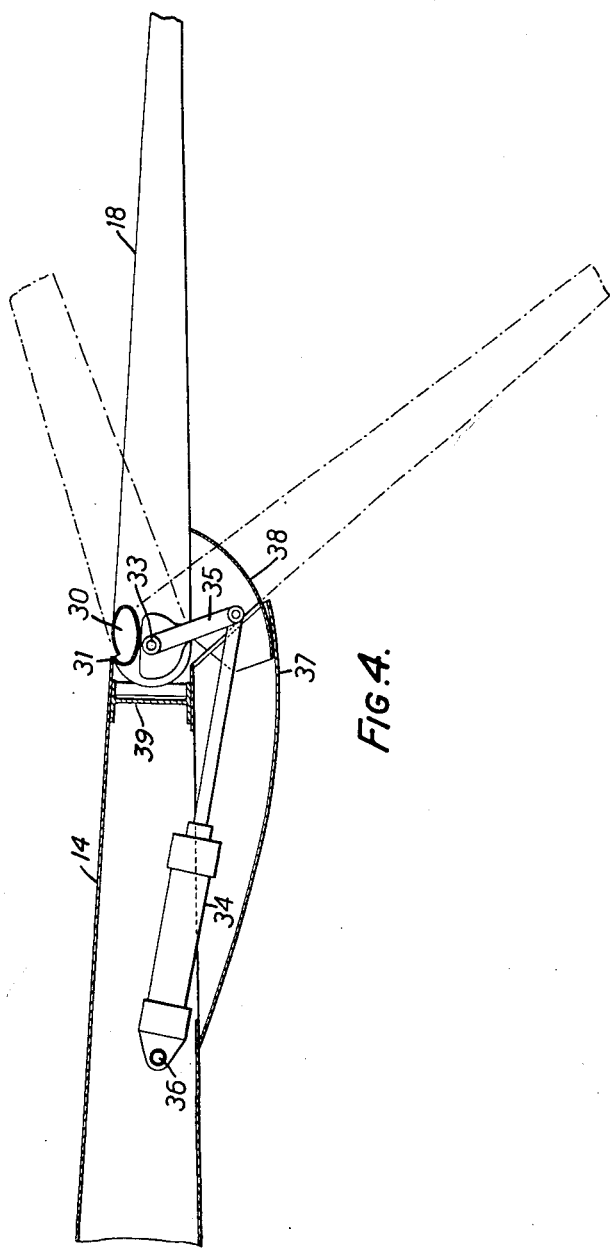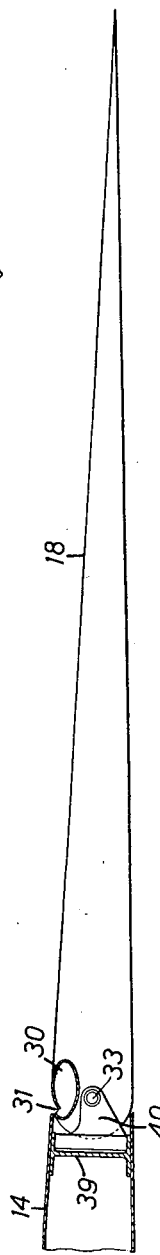

United States Patent Office 3,130,944
Patented Apr. 28, 1964

3,130,944
VARIABLE AREA AIRCRAFT WING
Raymond Frederick Creasey, Lytham-St. Annes, and Kenneth Burgin, St. Annes-on-Sea, England, assignors to English Electric Aviation Limited, Westminster, London, a company of England
Filed July 26, 1963, Ser. No. 297,826
Claims priority, application Great Britain July 31, 1962
6 Claims. (Cl. 244—43)

The present invention relates to an aircraft wing for attachment to a fuselage and has the primary object of providing an aircraft wing which is quickly adaptable from a basic structure to a structure suitable for different operational requirements.

For example a comparatively short range high speed aircraft designed for low level flight over land requires a different wing area and wing span than a similar long range aircraft designed for being catapult launched from an aircraft carrier and requiring very high aerodynamic lift characteristics.

The acceptable level of crew comfort for high speed low altitude flying over land requires a comparatively small wing, which is also compatible with short range V.T.O.L.-requirements. On the other hand, in high speed low level flight over sea less severe gust conditions are acceptable than for flying over land, which fact permits a larger wing span which can be used for attaining a higher take-off weight and hence an increased fuel load as needed for the longer range requirements of naval aircraft.

For increasing the versatility and operational availability of a given type of aircraft there is the requirement that any change-over has to be feasible as simply and quickly as possible.

With these and other objects in view which will become apparent later from this specification and the accompanying drawing, we provide an aircraft wing for attachment to a fuselage, comprising in combination: a main wing section fixedly attached to the fuselage, and exchangeably attached to said main wing section a comparatively small wing tip section and nose section in common to said main wing section and to said wing tip section, and a wing tip section of enlarged area and span and separate nose sections of enlarged chord dimensions attached to said main wing section and enlarged wing tip section, respectively.

Preferably the sweep back angle of the leading edge of said separate nose section of enlarged chord of said main wing section is substantially identical with the sweep back angle of the leading edge of said nose section in common to said main wing section and said comparatively small wing tip section, while the sweep back angle of the leading edge of said separate nose section of enlarged chord of said enlarged wing tip section is smaller than that of said separate nose section of said main wing and juts out chordwise beyond the leading edge of the latter at the juncture therewith.

Enlarged control surfaces (full span high lift flaps and ailerons) may also be fitted to the modified wing while leaving the inboard position of their jacks conveniently unchanged. The modified wing tip assembly is preferably hinged to the main wing section to be folded up for use on board an aircraft carrier.

The modified wing is so dimensioned that the aerodynamic loads on the enlarged nose section of the main wing section balance those of the enlarged wing tip assembly at sub-sonic speeds.

Since the two wings thus have identical low speed aerodynamic centre positions, no change in wing position on the fuselage is needed for the naval aircraft. The increased tip chord allows higher local loading at the tip of the wing and prevents the usual tip stalling on this type of wing when potentially efficient full span high lift trailing edge flaps are used. This increase in aerodynamic efficiency resulting from the increased span and powerful trailing edge flaps coupled with the increase in wing area on the modified wing allows a substantial increase in take-off weight from an aircraft carrier, when this weight is limited by the performance of the catapult. This increase in take-off weight allows more fuel to be carried giving a longer range. An additional advantage at low speed is the lower approach and touch down speeds possible with the modified wing. The two wings have acceptable levels of crew comfort when flying over land and sea, respectively. A lower induced drag both subsonically and supersonically results directly from the larger span of the modified wing. The only penalty subsonically is a negligible increase in profile drag due to the increase in wing wetted area, whilst supersonically, any increase in wing wave drag owing to the small decrease in leading edge sweep angle outboard of the fold line is cancelled out by the reduction in thickness/chord ratio on the inboard and outboard portions of the wing.

Figure 2:
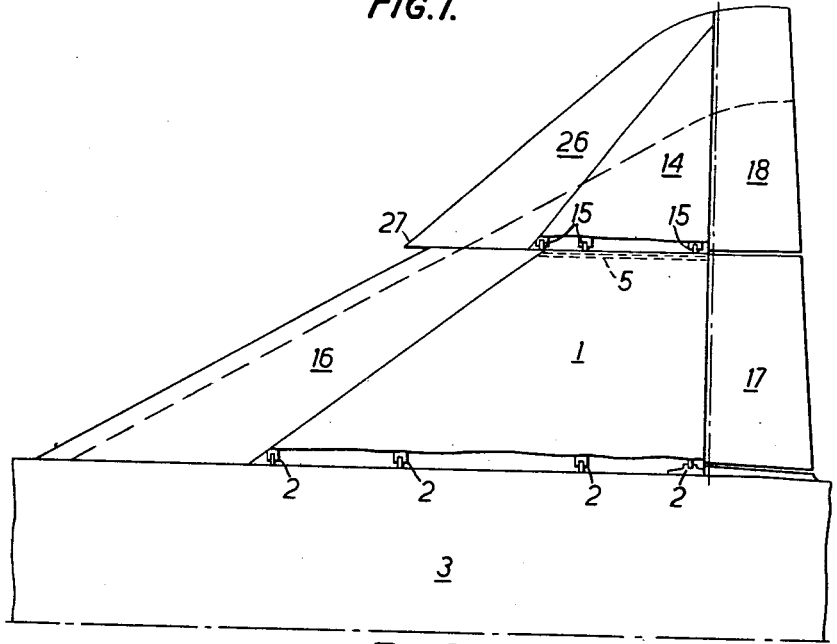
Figure 3:
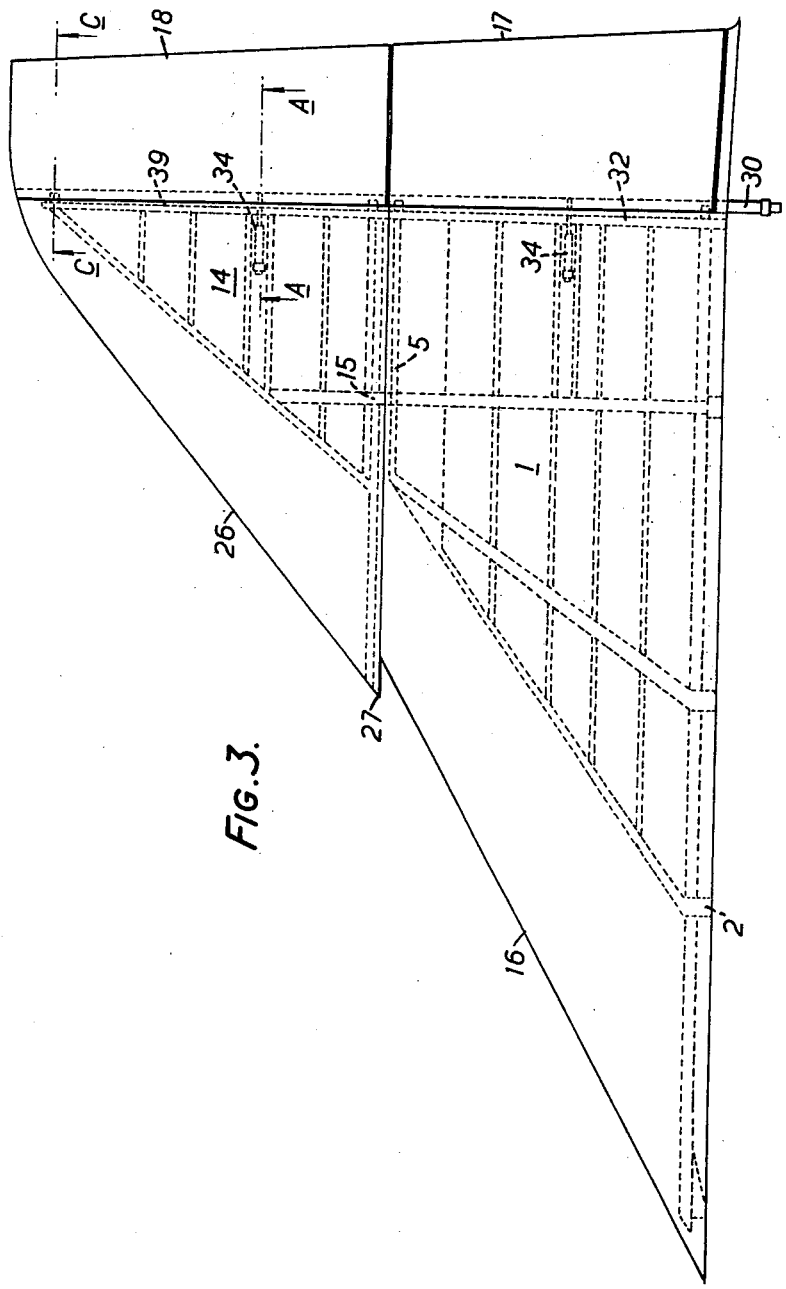

These and other features of our said invention will be clearly understood from the following description of a preferred embodiment thereof, given by way of example with reference to the accompanying drawing, in which:

FIG. 1 shows the basic wing in plan view, and
FIG. 2 shows the modified wing in plan view.
FIG. 3 shows the modified wing in plan view corresponding to FIG. 2 on a larger scale.
FIG. 4 is a section on the line A—A of FIG. 3, and
FIG. 5 is a similar section on the line C—C of FIG. 3.

Referring firstly to FIG. 1, the wing has a main section 1 of trapezium plan form attached to the fuselage 3 by means of the attachments 2, and a triangular wing tip section 4 detachably fixed to the outermost rib 5 of the main wing section 1. Moreover a nose section 6 is attached to both said main wing section 1 and wing tip section 4. High lift flaps 7 are hinged to the trailing edge of the main wing section 1, and ailerons 8 to that of the wing tip section 4 and the outer portion of the main wing 1. The wing as a whole is accordingly of delta configuration.

Referring now to FIG. 2, the main wing section 1 and its root attachments 2 to the fuselage 3 remain unaltered. The wing tip section 4 however is replaced by a wing tip section 14 of enlarged span and area, hinged to the outermost rib 5 at 15 so as to be capable of being folded by as usual for naval aircraft. An enlarged nose section 16 is attached to the main wing section 1, the leading edge of the enlarged nose section 16 being preferably parallel to that of the basic nose section 6 indicated in dotted lines in FIG. 2. An even more enlarged nose section 26 is attached to the enlarged wing tip section 14, preferably having a slightly smaller sweep back angle of the leading edge than the basic nose section 6, and at the juncture with the nose sections 16 jutting out chordwise at 27.

The high-lift flaps 17 are extended spanwise to the outermost rib 5 of the main wing section 1, and a combined high lift flap and aileron 18 is hinged to the trailing edge of the enlarged wing tip section 14.

Aerodynamically the enlarged nose section 16 is balanced against the enlarged wing tip assembly 26, 14, 18, so that at subsonic speeds the wings according to FIGS. 1 and 2 have the same centre of pressure position and no change in the position of the wing as a whole relative to the fuselage 3 is required.

The invention allows the rapid change from one wing assembly to the other with a minimum of alterations, so as to adapt an existing aircraft to different operational tasks, for example as a land based aircraft or as an aircraft carrier based naval aircraft.

Referring now to FIGS. 3–5 along the false spars 32 and 39 of the main wing section 1 and the wing tip section 14 respectively there is arranged a pipe 30 for blowing gaseous medium over the trailing-edge flaps 17 and ailerons 18. This pipe has a slot 31 in the span-wise direction on the upper surface of the wing. The flaps 17 and ailerons 18 are hinged on axles 33 which are journalled on brackets 40 (FIG. 5). These flaps and ailerons are connected by means of levers 35 to hydraulic jacks 34 which are pivotally connected as at 36 to the main wing section 1 and wing tip section 14 respectively.

The position of these jacks 34 remains the same whether the basic wing structure according to FIG. 1 or the modified wing structure according to FIG. 2 or 3 is used. A two-piece fairing 37, 38 (FIG. 4) is attached on the underside of the wing main section 1 or wing tip section 14 and on the flaps 17 and ailerons 18, respectively, in order to reduce the drag which otherwise would be caused by the jack 34 and arm 35 protruding from the underside of the wing and flap.

As indicated in FIG. 4 in chain dotted lines the ailerons 18 can be raised and lowered, while the high lift flaps 17 can be lowered only. In both cases gaseous medium can be blown out of the slots 31 over the top of the flaps 17 or ailerons 18 in order to improve their aerodynamic efficiency.

While we have herein described and illustrated in the accompanying drawings what may be considered a typical and particularly useful embodiment of our said invention, we wish it to be understood that we do not limit ourselves to the particular details and dimensions described and illustrated; for obvious modifications will occur to a person skilled in the art.

We claim:

1. An aircraft wing for attachment to a fuselage, comprising in combination: a main wing section fixedly attached to the fuselage, and exchangeably attached to said main wing section a comparatively small wing tip section and nose section in common to said main wing section and wing tip section and alternatively a wing tip section of enlarged area and span and separate nose sections of enlarged chord dimensions attached to said main wing section and enlarged wing tip section, respectively.

2. An aircraft wing as claimed in claim 1, wherein the sweep back angle of the leading edge of said separate nose section of enlarged chord of said main wing section is substantially identical with the sweep back angle of the leading edge of said nose section in common to said main wing section and said comparatively small wing tip section.

3. An aircraft wing as claimed in claim 1, wherein the sweep back angle of the leading edge of said separate nose section of enlarged chord of said enlarged wing tip section is smaller than that of said separate nose section of said main wing and juts out chordwise beyond the leading edge of the latter at the juncture therewith.

4. An aircraft wing as claimed in claim 1, comprising control flaps exchangeably hinged to the trailing edge of said main wing section, and actuating jacks for said flaps operatively connected therewith, flaps of shorter span being fitted to said main wing when fitted with said comparatively small wing tip section and nose section in common with the latter and said main wing section, and flaps of larger span being fitted to said main wing section when fitted with said enlarged chord nose sections and wing tip section, the inboard position of said actuating jacks remaining unchanged.

5. An aircraft wing as claimed in claim 1, comprising hinges provided at the juncture of said main wing section and said enlarged wing tip section allowing to fold the latter relative to said main wing section about a chordwise axis for use on board an aircraft carrier.

6. An aircraft wing as claimed in claim 1, wherein said enlarged chord nose section of said main wing and said enlarged wing tip section and its associated nose section are so dimensioned that their aerodynamic loads balance one another at subsonic speeds.

References Cited in the file of this patent

UNITED STATES PATENTS

| | | |
|---|---|---|
| 1,347,857 | Hill | July 27, 1920 |
| 1,560,860 | Ries | Nov. 10, 1925 |
| 2,375,423 | Lobelle | May 8, 1945 |
| 2,375,858 | Makaroff | May 15, 1945 |
| 2,416,104 | Lerche | Feb. 18, 1947 |
| 2,496,087 | Fleming | Jan. 31, 1950 |
| 2,537,369 | Ostroff | Jan. 9, 1951 |
| 2,712,421 | Naumann | July 5, 1955 |
| 2,802,630 | Birchill et al. | Aug. 13, 1957 |
| 2,896,881 | Attinello | July 28, 1959 |
| 3,045,947 | Bertin et al. | July 24, 1962 |

FOREIGN PATENTS

| | | |
|---|---|---|
| 876,091 | France | July 20, 1942 |
| 116,847 | Sweden | July 16, 1946 |